(12) United States Patent
Augustyn et al.

(10) Patent No.: US 11,747,096 B2
(45) Date of Patent: Sep. 5, 2023

(54) HEAT EXCHANGING MODULE HAVING A HOUSING COMPRISING AN INNER FRAME AND AN OUTER FRAME

(71) Applicant: Valeo Autosystemy Sp. z o.o., Skawina (PL)

(72) Inventors: Milosz Augustyn, Skawina (PL); Michal Belzowski, Skawina (PL); Dawid Szostek, Skawina (PL); Karol Pokrywinski, Skawina (PL)

(73) Assignee: Valeo Autosystemy Sp. z o.o., Skawina (PL)

( * ) Notice: Subject to any disclaimer, the term of this patent is extended or adjusted under 35 U.S.C. 154(b) by 289 days.

(21) Appl. No.: 16/965,847

(22) PCT Filed: Jan. 28, 2019

(86) PCT No.: PCT/EP2019/051974
§ 371 (c)(1),
(2) Date: Jul. 29, 2020

(87) PCT Pub. No.: WO2019/145526
PCT Pub. Date: Aug. 1, 2019

(65) Prior Publication Data
US 2021/0041187 A1 Feb. 11, 2021

(30) Foreign Application Priority Data
Jan. 29, 2018 (EP) .................... 18461509

(51) Int. Cl.
*F28F 9/00* (2006.01)
*F28D 9/00* (2006.01)
*B23P 15/26* (2006.01)

(52) U.S. Cl.
CPC .............. *F28F 9/001* (2013.01); *B23P 15/26* (2013.01); *F28D 9/005* (2013.01)

(58) Field of Classification Search
CPC ............ F28F 9/001; F28F 9/002; F28F 9/005; F25B 2339/047; F25B 2339/043;
(Continued)

(56) References Cited

U.S. PATENT DOCUMENTS

| | | | |
|---|---|---|---|
| 6,105,668 A * | 8/2000 | Schwarz | F28F 9/001 123/196 AB |
| 7,313,893 B2 * | 1/2008 | Voegele, Jr. | E04D 3/366 52/582.1 |

(Continued)

FOREIGN PATENT DOCUMENTS

| | | | |
|---|---|---|---|
| DE | 3400048 A1 | 7/1985 | |
| DE | 3916816 A * | 5/1990 | B60H 1/00328 |

(Continued)

OTHER PUBLICATIONS

Office Action issued in corresponding European Application No. 18461509.4, dated Mar. 3, 2022 (4 pages).
(Continued)

*Primary Examiner* — Jianying C Atkisson
*Assistant Examiner* — For K Ling
(74) *Attorney, Agent, or Firm* — Osha Bergman Watanabe & Burton LLP (57) ABSTRACT

Heat exchanging module (1) comprising at least a heat exchanger (2) between two fluids and a housing (6), said housing (6) having at least an inner frame (20) and an outer frame (60), the inner frame (20) being arranged for holding the heat exchanger (2), the outer frame (60) being arranged for holding the inner frame (20), characterized in that the inner frame (20) and the outer frame (60) are separated by a non-null distance (100) configured to form a thermal isolation between the heat exchanger (2) and a surrounding environment of the housing (6).

23 Claims, 5 Drawing Sheets

(58) Field of Classification Search
CPC ........ F25B 2339/044; F25B 2339/0441–0443; F25B 39/04; F28D 9/0075; F28D 9/0037; F28D 9/005; F16B 5/004; F16B 5/0044; F16B 5/06; F16B 5/0064
USPC ........................................................ 165/157
See application file for complete search history.

(56) References Cited

U.S. PATENT DOCUMENTS

| | | | | |
|---|---|---|---|---|
| 7,347,253 | B2 * | 3/2008 | Tauren | F28F 9/22 |
| | | | | 165/157 |
| 9,709,342 | B2 * | 7/2017 | Dornseif | F28F 9/02 |
| 2011/0120671 | A1 * | 5/2011 | Brauning | F28F 9/02 |
| | | | | 165/96 |
| 2011/0297350 | A1 * | 12/2011 | Gidner | F28F 9/0075 |
| | | | | 165/67 |
| 2012/0210986 | A1 * | 8/2012 | Ghiani | F28F 9/001 |
| | | | | 123/542 |
| 2014/0130764 | A1 * | 5/2014 | Saumweber | F28F 9/007 |
| | | | | 123/184.21 |
| 2014/0311143 | A1 * | 10/2014 | Speidel | F02B 37/00 |
| | | | | 60/599 |
| 2015/0338167 | A1 * | 11/2015 | Pomin | F28D 1/05308 |
| | | | | 165/151 |

FOREIGN PATENT DOCUMENTS

| | | | | |
|---|---|---|---|---|
| DE | 102017208494 | A1 | 11/2017 | |
| EP | 2784425 | A1 * | 10/2014 | ............ F25B 39/04 |
| EP | 3358279 | A1 * | 8/2018 | ............ F24H 4/00 |
| JP | 2017067372 | A * | 4/2017 | ............ F24H 4/00 |
| WO | 2007062939 | A1 | 6/2007 | |
| WO | 2009068480 | A1 | 6/2009 | |
| WO | 2011109885 | A1 | 9/2011 | |
| WO | 2011109886 | A1 | 9/2011 | |

OTHER PUBLICATIONS

International Search Report and Written Opinion in corresponding International Application No. PCT/EP2019/051974, dated Apr. 25, 2019 (9 pages).

The Second Office Action issued in Chinese Application No. 201980018259.X, dated May 11, 2022 (10 pages).

* cited by examiner

HEAT EXCHANGING MODULE HAVING A HOUSING COMPRISING AN INNER FRAME AND AN OUTER FRAME

The present invention relates to heat exchangers, especially heat exchangers used in air conditioning systems.

Heat exchangers, and particularly water condensers and chillers, are designed to enable the circulation of a coolant and a refrigerant fluid in adjacent yet separated spaces, to allow the exchange of heat between those fluids. These heat exchangers may be equipped with additional elements such as a receiver drier designed to separate the liquid portion of the refrigerant fluid from the gaseous portion, forming a heat exchanging module.

Heat exchangers used nowadays are subjected to undesired heat transfer between the fluids circulating inside them and an environment surrounding the heat exchanger. To compensate for these undesired heat transfers, the heat exchanger and/or the system in which it is installed needs to be designed to increase the transfer of heat between the two fluids, for example by enlarging the heat exchanger.

The invention aims at resolving the problem previously laid out, by limiting the heat loss of the heat exchanger to increase its performance.

An object of present invention is a heat exchanging module comprising at least a heat exchanger between two fluids and a housing, said housing having at least an inner frame and an outer frame, the inner frame being arranged for holding the heat exchanger, the outer frame being arranged for holding the inner frame, characterized in that the inner frame and the outer frame are separated by a non-null distance configured to form a thermal isolation between the heat exchanger and a surrounding environment of the housing.

A heat exchanging module according to this description sensibly enhance its performance and therefore the performance of the whole air conditioning system including this type of heat exchanging module. This performance enhancement can be used to downsize other elements of the system and/or to facilitate the rearrangement of these elements inside the hood of the vehicle. Additionally, such a housing can be easily adjusted or modified to fit several types or sizes of heat exchanging module, without a full overhaul of the heat exchanging module.

Furthermore, such a housing dampens the vibration subjected to the heat exchanging module by the vehicle. Such a vibration dampening limits the wear of the heat exchanging module, reducing the breakage risks of the ducts or attachments and enhancing its longevity, thus reducing the need for maintenance and its costs.

The heat exchanging module according to the invention comprises at least one of the following parameters, either alone or in combination with another:

- the heat exchanger is arranged to allow the exchange of heat between two fluids circulating in two adjacent yet separated spaces located inside of the heat exchanger. One of these two fluids is a first fluid, for example a refrigerant fluid, the other is a second fluid, for example a coolant fluid. The heat exchanger is configured so as to allow an exchange of heat to happen between the first fluid and the second fluid, for example by providing tubes in which the fluids can circulate, these tubes being made out of a heat conductive material. Such a heat conductive material comprises but is not limited to aluminum or an alloy comprising aluminum,
- the heat exchanger is constituted of a superposition of plates on top of each other along an A direction. The A direction is the direction of superposition of the plates. The A direction also represents a vertical direction of the heat exchanging module. This superposition of plates forms two separated and adjacent spaces, one in which a first fluid is able to circulate, the other one in which a second fluid is able to circulate,
- the distance is non-null on at least a portion of the housing. In this embodiment, the housing has a non-null distance between the inner frame and the outer frame on at least a portion of the inner frame and the outer frame. The inner frame and the outer frame are not separated by a non-null distance in every point of the housing, the inner frame and/or the outer frame having portion which contacts the outer frame and/or the inner frame, respectively,
- the housing has at least a spacing means on at least one of its side. The spacing means is located on the inner frame and/or on the outer frame. Said spacing means is located on an inner face and/or an outer face of the outer frame, and/or on an inner surface and/or an outer surface of the inner frame. Any combination can be used, i.e. a spacing means on the outer surface of the inner frame and a spacing means located on an inner face of the outer frame,
- inner face or inner surface refers to a face or a surface of a part of the housing facing or in the direction of the heat exchanger, outer face or outer surface referring to a face or surface opposed to the inner face or the inner surface. Said outer face or outer surface, as the case may be, faces said surrounding environment of the housing,
- the non-null distance is generated by the spacing mean. In another embodiment, a plurality of spacing means collaborates to generate such non-null distance,
- the spacing means comprises at least a rib formed on at least the inner frame or the outer frame,
- the rib extends between the inner frame and the outer frame,
- the outer frame comprises a rib, here an outer rib, said outer rib extending on the inside of the outer frame, the inner frame having an inner rib, said inner rib extending on the outside of the inner frame, wherein the outer rib and the inner rib collaborates to limit a movement between the outer frame and the inner frame. In a first embodiment of the invention, the outer rib and the inner rib limit the movement between the outer frame and the inner frame in a direction perpendicular to the A direction, in a single way. In a second embodiment of the invention, the outer rib and the inner rib limit the movement in both ways of the direction perpendicular to the A direction,
- the spacing means comprises an inner rib and an outer rib collaborating together. The non-null distance is generated by the collaboration between the inner rib and the outer rib,
- the inner rib and the outer rib face each other, for example in a plane that is perpendicular to a lateral side of the heat exchanger. In this configuration, the inner rib and the outer rib each extend in a plane, the plane of the inner rib being parallel to the plane of the outer rib. In this configuration, the inner rib and the outer rib limit the movement of the inner frame relatively to the outer frame in at least one direction. Advantageously, the inner rib and the outer rib limit the movement of the inner frame relatively to the outer frame in a unique direction, the inner rib and the outer rib have complementary shapes. In this configuration, the inner rib is a negative format of the outer rib. The outer rib can therefore enter the inner rib or the inner rib can enter the outer rib. The inner rib is thus an image in negative of the outer rib, and vice-versa. This interaction allows the movement limitation of the inner frame respective to the outer frame, in both ways of the longitudinal direction, the outer rib is I shaped, seen in a direction parallel to the A direction. This "I" shape is also visible in a cut plan parallel to the plan in which the plates of the heat exchanger extend in their greater dimension. In this configuration, the outer rib comprises a single bar. The single bar is linked to a wall of the outer frame, the inner rib is U shaped, seen in a direction parallel to the A direction. This "U" shape is also visible in a cut plan parallel to the plan in which the plates of the heat exchanger extend in their greater dimension. In this configuration, the inner rib comprises two side bars linked by a wall of the outer frame. A U shaped inner rib limits the movement of the inner frame relatively to the outer frame in a both ways of a direction perpendicular to the A direction, the heat exchanging module comprises an internal flange which extends in an inner space delimited by the inner frame. This internal flange extends from the inner frame toward the heat exchanger. More precisely, this internal flange extends from the inner surface of the inner frame, the internal flange of the inner frame is arranged for mechanically holding the heat exchanger. In this configuration, the internal flange limits or blocks the movement of the heat exchanger relatively to the inner frame in a direction perpendicular to the A direction. In a preferred embodiment, the internal flange limits or blocks the movement of the heat exchanger relatively to the inner frame in at least one direction perpendicular to the A direction. The heat exchanging module may comprise a plurality of internal flanges, located on at least one side of the inner frame, the housing comprises a plurality of ribs, at least two of these ribs being located on adjacent side of the housing, adjacent being for example perpendicular sides. The ribs may be located on adjacent sides of the inner frame or on adjacent sides of the outer frame, the housing is arranged for receiving a receiver drier of the heat exchanging module, the inner frame is designed to carry the receiver drier. To this end, the inner frame comprises a bottle circling part to accommodate the receiver drier, the outer frame further comprises a bottle receiving area. The bottle receiving area is designed to accommodate the bottle inside the outer frame, the housing comprises at least a rib, here a bottle bar, inside an area arranged for holding the receiver drier, said rib making contact with said receiver drier. The bottle bar is designed to hold the receiver drier. Additionally, the bottle bar dampens the vibration transmitted to the receiver drier by the vehicle or one of its part, the bottle bar extends out of the outer frame. More particularly, the bottle bar extends from the bottle receiving area of the outer frame, the heat exchanging module comprises a receiver drier. The receiver drier is designed to filter the refrigerant fluid, that is to say that the receiver drier is designed to separate the gaseous phase from the liquid phase. This ability ensures that the refrigerant fluid leaving the bottle is liquid and does not risk damaging a compressor pumping the refrigerant fluid throughout the refrigerant circuit, the outer frame comprises at least two parts. In an embodiment, the outer frame comprises a bottom part and a top part that define an inner area of the outer frame. Other configurations can be used, i.e. the outer frame can comprise two side parts, or a bottom part in a single piece with a top part comprising two pieces. Border between the bottom part and the top part is in a plan that cuts the heat exchanger, the housing is made of a material having low thermal conductivity. Such material can be polycarbonate, polystyrene, polyurethane or the like, the housing is made of a material having vibration dampening properties. The vibration dampening properties of the housing allows to reduce the stress caused by the vehicle's vibration to the heat exchanging module, such stress reducing the lifespan of the heat exchanging module, at least one spacing means acts as a positioning means of the inner frame inside the outer frame, said spacing means acting as a positioning means being inclined relatively to a plane of an outer surface of the inner frame or to a plane perpendicular to a bottom side of the outer frame and parallel to a longitudinal direction L. Said spacing means acting as a positioning means and being inclined is therefore referenced to as an angled rib. The positioning means is configured to ease the insertion of the inner frame inside the outer frame. The positioning mean's function is to offset a possible misalignment between the inner frame and the outer frame during the insertion of the inner frame inside the outer frame, thus facilitating the insertion of the inner frame inside the outer frame, the angled rib is inclined relatively to a plane of the outer surface of the inner frame, the angled rib is located on the outer frame and/or on the inner frame. In another embodiment of the invention, the angled rib is the outer rib and/or the inner rib as defined below. Alternatively, the angled rib is separated from the outer rib and/or the inner rib as defined below, said spacing means acting as a positioning means further comprises an inner face of the outer frame, said inner face being inclined relatively to the plane perpendicular to a bottom side of the outer frame and parallel to a longitudinal direction L, the angled rib and the inner face are inclined in the same direction relatively to the plane selected, the inner face and the angled rib are located on the same side of the housing, the inner face and the angled rib are located at opposite side of the housing relatively to the heat exchanger, the inner wall has an angle strictly greater than 0° and inferior or equal to 5°. The angle of the inner wall is measured between a plane of the inner wall of the bottom part and a plane perpendicular to a bottom side of the bottom part and parallel to the longitudinal direction L, the angled rib has an angle strictly greater than 0° and inferior or equal to 2°. The angle of the angled rib is measured between a plane of an outer surface carrying the angled rib and a plane of a free edge of said angled rib, the rib extends on a portion of the inner frame or the outer frame carrying the rib, the portion being shorter than a height of the inner frame or the outer frame carrying the rib. The height of the inner frame is the dimension of the inner frame along the A direction. In this configuration, the rib make contact with only one extremity of the wall of the inner frame or the outer frame, respectively, the rib comprises an indexing means facilitating the insertion of the inner frame inside of the outer frame. The indexing mean's function is to offset a possible misalignment between the inner frame and the outer frame during the insertion of the inner frame inside the outer frame, thus facilitating the insertion of the inner frame inside the outer frame, the indexing means is located at a vertical end of the rib. The vertical end of the rib is a end of the rib along the A direction, the indexing means comprises a narrowed end of the rib. This narrowed end comprises at least one chamfered portion, the two side bars are further apart at a first vertical end of the rib compared to a second vertical end of the rib, the housing comprises at least one retaining means designed to hold the heat exchanger inside the inner frame, the retaining means is located on the inner frame. Furthermore, the retaining means is located on a top edge of the inner frame, the retaining means is placed onto the inner frame after the introduction of the heat exchanger inside the inner frame, the retaining means is a flexible tooth, prone to deformation during the introduction of the heat exchanger inside the inner frame, and prone to spring back in position to block the heat exchanger inside the inner frame.

The invention also relates to a method of assembly of a heat exchanging module as described hereabove, comprising a first step of mounting of the heat exchanger inside the inner frame, and a second step of mounting of the inner frame inside the outer frame. In a preferred embodiment, the second step comprise an intermediate step of mounting the inner frame inside of a bottom part of the outer frame, the process further comprising a third step of mounting of a top part of the outer frame on the bottom part of the outer frame.

Other characteristics, details and advantages of the invention can be inferred from the description of the invention hereunder. Various embodiments are represented in the figures, wherein.

It must be noted that the figures disclose the invention in a detailed enough way to be implemented, said figures helping to better define the invention if needs be. The invention should however not be limited to the embodiment disclosed in the description.

In the following description, the vertical direction V refers to the dimension along which the plates of the heat exchanger are superposed. This vertical direction V is represented by a reference line A. The longitudinal direction L refers to the direction perpendicular to the vertical direction V along which the heat exchanger extends in its greater dimension. The transversal direction T is the direction perpendicular to both the vertical direction V and the longitudinal direction L. These directions are represented by a reference triad L, V, T in the different figures.

In the present description, some elements or parameters may be indexed, such as a first element and a second element. In this case, unless stated otherwise, this indexation is only meant to differentiate and name elements which are similar but not identical. No idea of priority should be inferred from such indexation, as these terms may be switched without betraying the invention. Additionally, this indexation does not imply any order in mounting or use of the elements of the invention.

Figure 1:
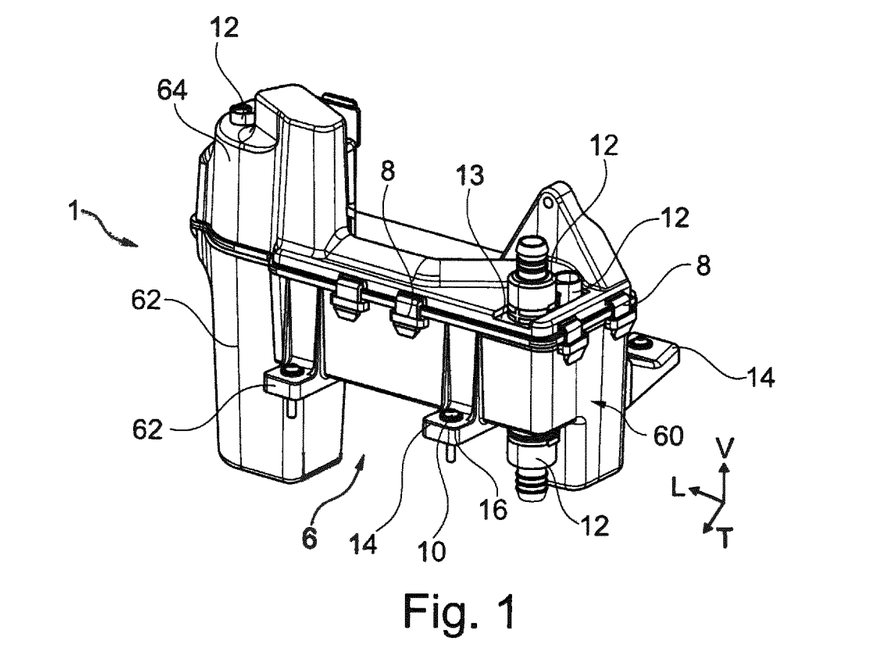
FIG. 1 features a heat exchanging module according to the invention.

FIG. 1 represents a heat exchanging module 1 according to the invention. Said heat exchanging module 1 is a part of an air-conditioning circuit, comprising a plurality of elements such as a compressor and at least another heat exchanger, the air conditioning circuit being designed to allow the modification of the temperature and/or humidity of an air blown inside a cabin of a vehicle.

The heat exchanging module 1 here described finds a particularly fitting application in a heat pump mode. The function of the heat exchanging module 1 is however not limited to the heat pump mode and could be transposed, for instance, to a cooling mode.

The heat exchanging module 1 comprise a heat exchanger 2 concealed into a housing 6. This housing 6 consists of an inner frame 20 inside of an outer frame 60. The inner frame 20 is visible on FIG. 2 and described hereunder.

The outer frame 60 is made of two parts, a top part 64 and a bottom part 62. The top part 64 is attached to the bottom part 62 through a plurality of attachment means 8, such as click-in means. Other attachment means 8 can be employed, as long as they allow the reversion of the attachment, which is the separation of the top part 64 and of the bottom part 62 without destruction of one and/or the other piece.

The housing 6, more specifically the bottom part 62 of the outer frame 60, comprises a plurality of fixation holes 16 collaborating with fixation means 10 to secure the heat exchanging module 1 on a part of the vehicle. These fixation holes 16 are located on arms 14 extending perpendicularly to the heat exchanging module 1. Such arms 14 are further illustrated on FIG. 3. The number and position of these fixation holes 16 and arms 14 may vary according to the position of the heat exchanging module 1 onto the vehicle.

The heat exchanger 2 is designed to allow the circulation of a refrigerant fluid and a coolant fluid in two separated yet adjacent spaces, to allow a heat exchange between those fluids. To do so, the heat exchanger 2 comprises at least four fluid ports 12, three of them being visible on FIG. 1.

The outer frame 60 has a plurality of holes 13, to allow the exit of the fluid ports 12 out of the housing 6. One hole 13 is made in the bottom part 62 and two holes 13 are realized in the top part 64. These holes 13 are located in front of the fluid ports 12 of the heat exchanger 2. These holes 13 allow the insertion of fluid pipes (not shown) in the fluid ports 12 of the heat exchanger 2.

Figure 2:
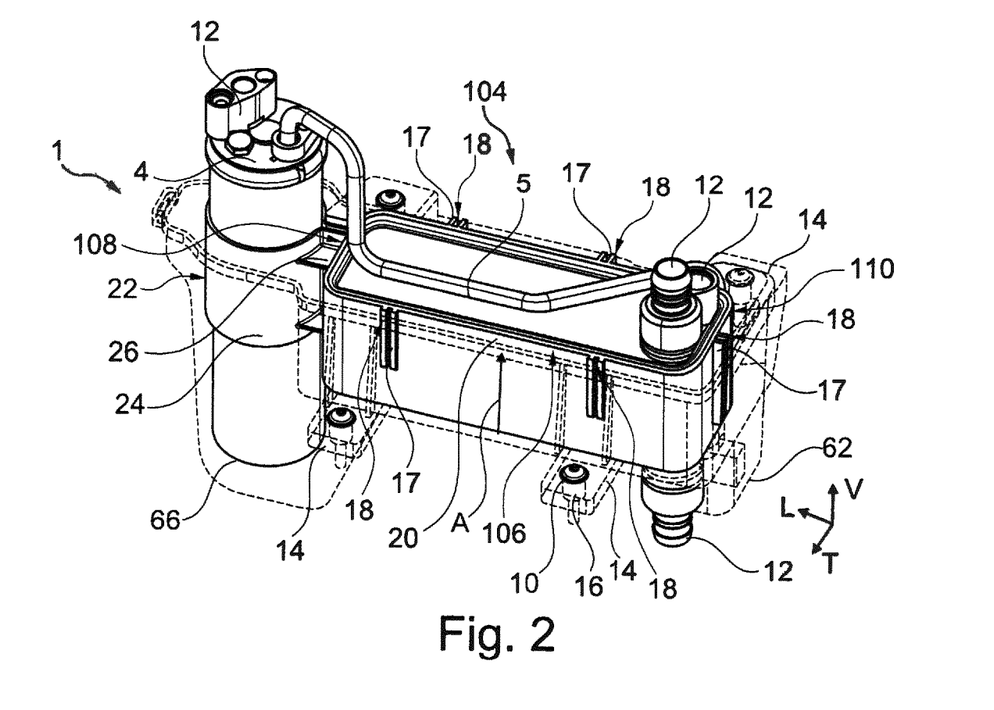
FIG. 2 features a heat exchanging module stripped of a top part of a housing, to illustrate the inside of said housing, FIG. 3 features a top view of the heat exchanging module.

On FIG. 2, the top part 64 of the outer frame 60 is removed and the bottom part 62 is represented in transparence to show the heat exchanger 2 and the inner frame 20 of the housing 6.

The housing 6 further comprises an inner frame 20, designed to carry the heat exchanger 2. More precisely, the outer frame 60 of the housing 6 holds the inner frame 20, which carries the heat exchanger 2. The heat exchanger 2 is constituted of a superposition of plates on top of each other along the A direction. In the example of the invention described herein, the A direction is a vertical direction V of the triad LVT.

This superposition of plates forms the two separated and adjacent spaces, one in which a first fluid is able to circulate, the other one in which a second fluid is able to circulate. The superposition of plates is where the exchange of heat between the fluids take place. These spaces are divided in chambers for the circulation of the fluids. These chambers extend mainly in a plane perpendicular to the A direction. Chambers configured for the circulation of the first fluid are alternated with chambers for the circulation of the second fluid, to maximize the heat exchanges between the two fluids. The circulation of a fluid inside a chamber follows at least one "U" pattern, the fluid entering the chamber via a fluid admission and exiting the chamber through a fluid output, the fluid admission and the fluid output being located on a same longitudinal side of the chamber, the chamber having a separation between the fluid admission and the fluid output to force the fluid to circulate inside the chamber following a "U" shaped pattern. According to another embodiment not shown here, the fluid could circulate inside the chamber following an "I" shaped pattern.

The heat exchanger 2 is connected to a receiver drier 4 by a pipe 5. The receiver drier 4 is tube-shaped, and is designed to filter the refrigerant fluid. In other words, the receiver drier 4 is designed to separate the gaseous phase of the refrigerant fluid from its liquid phase. The receiver drier 4 extends mainly along the A direction. The addition of the heat exchanger 2, the receiver drier 4 and the housing 6 form a heat exchanging module 1 according to an embodiment of the invention.

The receiver drier 4 is located at a first longitudinal side 108 of the heat exchanger 2, the fluid ports 12 of the heat exchanger 2 being located near a second longitudinal side 110 of the heat exchanger 2. The first longitudinal side 108 and the second longitudinal side 110 are separated by the heat exchanger 2.

The receiver drier 4 is held by the inner frame 20, more specifically by a bottle circling part 22. The bottle circling part 22 features a circle part 24 large enough to allow the insertion of the receiver drier 4 and tight enough to hold the receiver drier 4 in position. The bottle circling part 22 comprises a portion 26 formed by two bands 27 which can be moved away from each other or brought together, to allow an easy insertion of the receiver drier 4 in the bottle circling part 22. The portion 26 further comprises a tightening means 25, here a screw entering a hole inside the bands 27, to bring together the bands 27 and secure the receiver drier 4 inside the bottle circling part 22.

The outer frame 60 comprises a bottle receiving area 66, designed to accommodate the receiver drier 4 inside of the outer frame 60.

The housing 6 further comprises a plurality of spacing means 17, which are in this embodiment a plurality of ribs 18. The interaction between those spacing means 17, the inner frame 20 and the outer frame 60 of the housing 6 are more visible on FIG. 3, and described in more details hereunder.

The housing 6 also comprises a first transversal side 104 and a second transversal side 106. The first transversal side 104 and the second transversal side 106 are separated by the heat exchanger 2.

Figure 3:
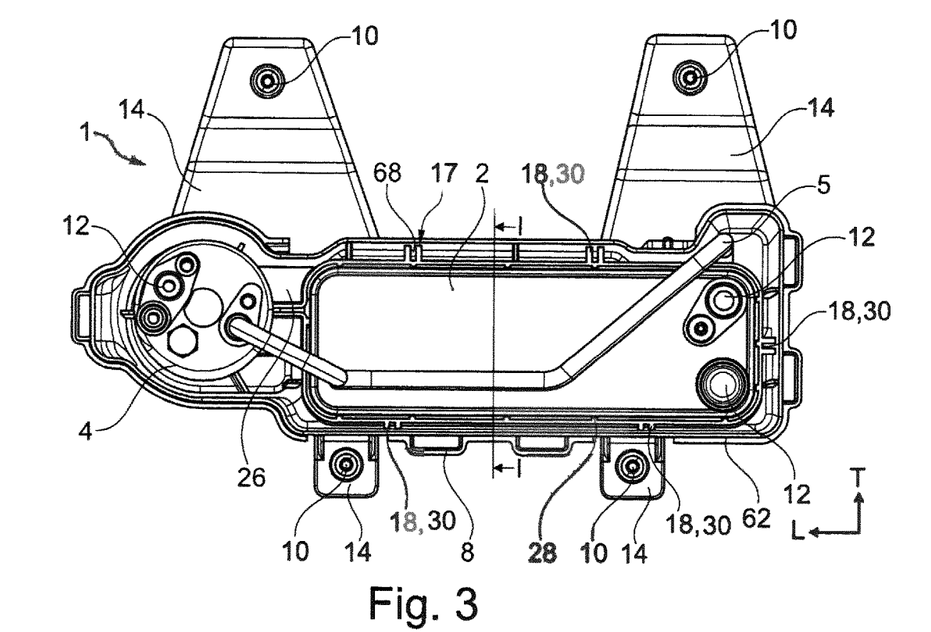

FIG. 3 is a top view of the heat exchanging module 1 of the invention, stripped of the top part 64 of the outer frame 60.

The housing 6 has a plurality of spacing means 17, located either on the outer frame 60 and/or on the inner frame 20. These spacing means 17, each formed by a rib 18, can be located on either the inner face 70 of the outer frame 60, the outer surface 34 of the inner frame 20 or the inner surface 32 of the inner frame 20. Here, inner face 70, inner surface 32 or inside refers to a face, a surface or a direction of a part of the housing 6 facing or in the direction of the heat exchanger 2.

Outer face 72, outer surface 34 or outside refers to a face, a surface or a direction of a part of the housing 6 facing or in the direction of an environment surrounding the housing 6.

The outer face 72, outer surface 34 or outside is therefore opposed to the inner face 70, the inner surface 32, or the inside, respectively.

Hereunder, the term and reference rib 18 designates any kind of shape as long as this shape is an extension out of the inner or outer frame. According to an embodiment not shown here, these ribs 18 could be separated elements, that is to say that they would not be extensions of the inner or outer frame but elements added between the outer frame and the inner frame.

The outer frame 60 comprises a spacing means 17 in the form of an outer rib 68, extending on the inside of the outer frame 60. More precisely, the outer rib 68 extends from the inner face 70 of the outer frame 60. This outer rib 68 extends toward the inner frame 20 of the housing 6.

The inner frame 20 comprises a spacing means 17 in the form of an inner rib 30, extending on the outside of the inner frame 20. More precisely, the inner rib 30 extends from the outer surface 34 of the inner frame 20. This inner rib 30 extends away from the heat exchanger 2.

Figure 4:
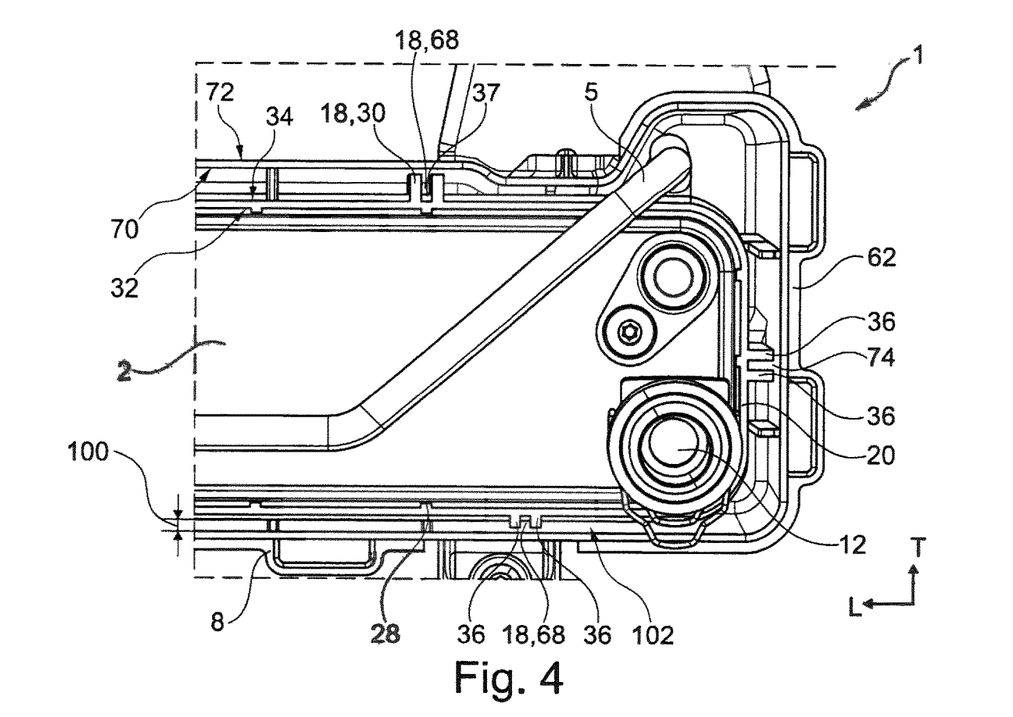
FIG. 4 is a close-up of FIG. 3, to better illustrate the configuration of the housing.

As visible on FIG. 4, an outer rib 68 collaborates with an inner rib 30 to form the non-null distance 100 between the inner frame 20 and the outer frame 60. The non-null distance 100 is measured between the inner frame 20 and the outer frame 60. More precisely, said non-null distance 100 is measured between the outer surface 34 of the inner frame 20 and the inner face 70 of the outer frame 60.

The non-null distance 100 comprises a space 102 for air.

In this configuration, the heat of one of the fluid circulating inside the heat exchanger 2 is transferred mainly to the other fluid circulating inside the heat exchanger 2, with only a small portion of undesired exchange to the environment.

More specifically, the insulation between the heat exchanger 2 and the environment increases the heat transfer from the refrigerant fluid to the coolant fluid. In turn, this greater heat transfer has an effect on the air conditioning circuit, being understood that the expression "air conditioning circuit" is here to be understood as a "technology that modifies the condition of the air", whether it is to cool it or to heat it.

The inner frame 20 additionally comprises internal flange 28. Such internal flange 28 extends from the inner surface 32 of the inner frame 20. This internal flange 28 extends toward the heat exchanger 2. The internal flange 28 makes contact with the heat exchanger 2, thus mechanically holding the heat exchanger 2 inside the inner frame 20. The inner frame 20 further comprises a plurality of internal flanges 28 delimiting an area having dimensions adapted to host the heat exchanger 2, the dimensions of the area being approximately equal to an outer dimension of the heat exchanger 2, i.e. slightly larger than the outer dimension of the heat exchanger 2. The outer dimension of the heat exchanger 2 is the perimeter of the heat exchanger, the perimeter being measured in a plane perpendicular to the A direction, i.e. its length along the longitudinal direction L and its width along the transversal dimension T.

The internal flanges 28 are located on at least one of the inner surface 32 of the inner frame 20. The inner rib 30 and the outer rib 68 have complementary shapes, the inner rib 30 being a negative format of the outer rib 68. The form of each of these internal flanges 18 are further described in FIG. 4 hereunder.

FIG. 4 features a close-up of the view exposed in FIG. 3.

The outer rib 68 is I shaped, seen along the A direction. This "I" shape is also visible in a cut plan parallel to the plan in which the plates of the heat exchanger 2 extend in their greater dimension. It features a single bar 74. In this embodiment of the invention, all the outer ribs 68 have the same shape and dimensions, but it is understood that at least one outer rib 68 can feature a different shape and/or dimensions.

The inner rib 30 is U shaped seen along the A direction. This "U" shape is also visible in a cut plan parallel to the plan in which the plates of the heat exchanger 2 extend in their greater dimension. It features two side bars 36, parallel to each other and separated by a space 37. The inner ribs 30 featured in the present description of the invention have different dimensions while retaining their U shape. In another embodiment, the inner ribs 30 all have the same dimensions.

An outer rib 68 extends in the space 37 between the two side bars 36 of the inner rib 30 in front of it. To allow this insertion, the space 37 between the two side bars 36 is larger than the single bar 74 of the outer rib 68 which enter the space 37. The interaction between the single bar 64 entering the space 37 and the side bars 36 limits the movement of the inner frame 20 relatively to the outer frame 60 in both ways of a longitudinal direction.

The internal flange 28 is I shaped seen along the A direction. The internal flange 28 extends from the top edge 40 to the bottom face 42 of the inner frame 20.

Figure 5:
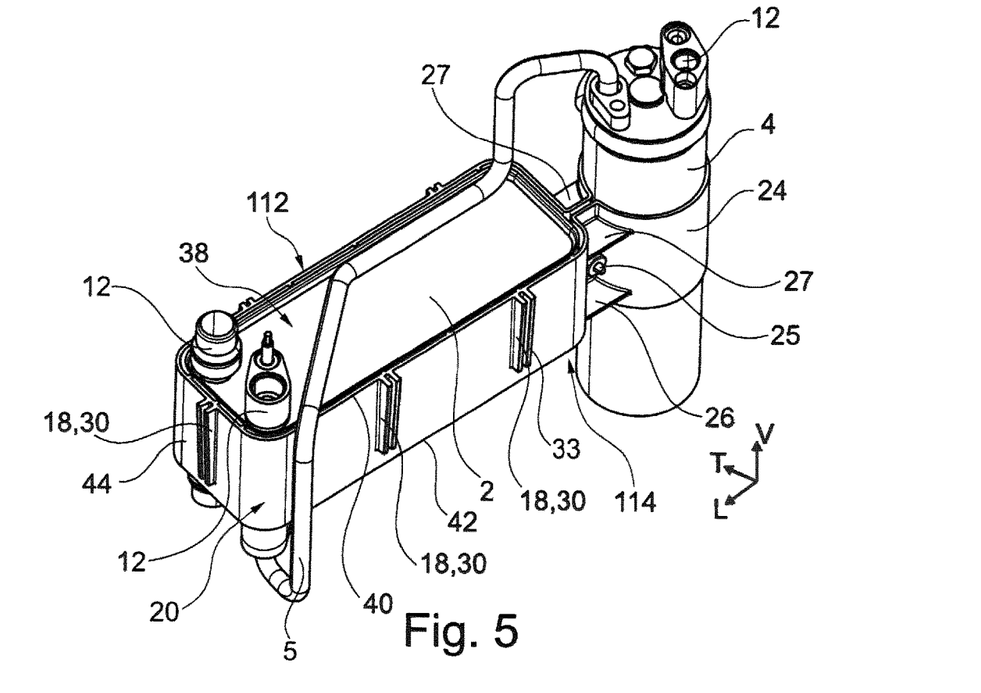
FIG. 5 is a perspective view of the heat exchanging module without an outer frame, FIG. 6 features the bottom part the outer frame.

FIG. 5 illustrates more precisely the configuration of the inner frame 20 and of an inner rib 30.

The inner frame 20 has the shape of a straight prism, open at a first vertical side 112 and closed at a second vertical side 114. Said second vertical side 114 limits the insertion of the heat exchanger 2 inside the inner frame 20. The inner frame 20 further comprises a plurality of walls 44 extending between a bottom face 42 located at the second vertical side 114, and a top edge 40 located at the first vertical side 112.

The walls 44 of the inner frame 20 define an inner space 38. Such an inner space 38 receives the heat exchanger 2. The internal flange 28 extends inside the inner space 38, to mechanically hold the heat exchanger 2 inside the inner space 38.

The inner rib 30 extends on the wall 44 of the inner frame 20, parallel to the A direction. The inner rib 30 has a length, called inner rib 30 length, which is its dimension along the A direction. The wall 44 has a length, called wall length, which is its dimension along the A direction. The inner rib 30 extends from the top edge 40 of the inner frame 20, the inner rib 30 length being inferior to the wall length. In such configuration, the inner rib 30 extends only on a portion of the wall 44. This means that in this embodiment, the inner rib 30 does not extend all the way from the top edge 40 to the bottom face 42. However, in other embodiments, the inner rib 30 extends between the top edge 40 and the bottom face 42.

The inner frame 20 comprises a plurality of inner ribs 30, located on several sides of the inner frame 20. Each wall 44 comprises at least an inner rib 30, except the wall 44 of the inner frame 20 which comprises the portion 26 connecting the bottle circling part 22 to the inner frame 20.

FIG. 5 also represents the pipe 5 connecting a fluid port 12 to the receiver drier 4. Said receiver drier 4 has a fluid port 12, adapted to let the fluid in or out of the receiver drier 4, toward or from the rest of the air conditioning system, respectively.

Figure 6:
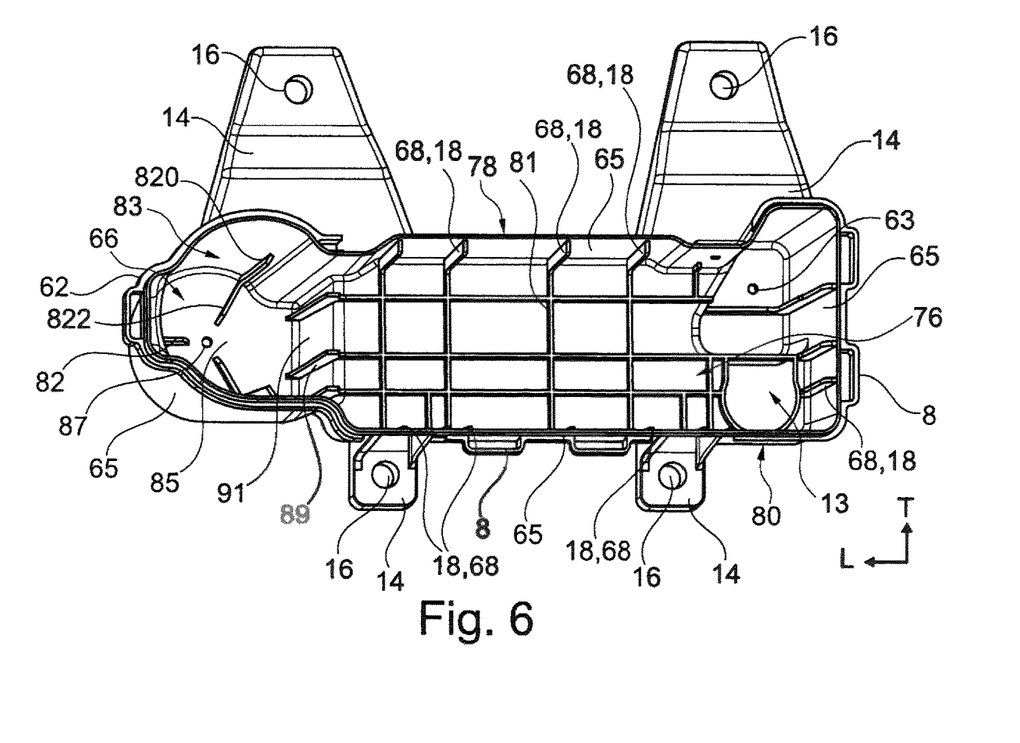

FIG. 6 features the bottom part 62 of the outer frame 60.

The outer frame 60, more precisely the bottom part 62, comprises a plurality of walls 65 defining an inner area 76 configured to receive and accommodate the inner frame 20 of the housing 6. A plurality of outer ribs 68 extends from the inner surface 70 of the outer frame 60. The outer rib 68 extends in parallel with the A direction, from the bottom side 80 toward the rim 78 of the bottom part 62, said rim 78 defining an open mouth of the bottom part 62. The outer rib 68 has a length, called outer rib 68 length, which is its dimension along the A direction. The wall 65 has a length, called wall length, which is its dimension along the A direction. The outer rib 68 length is inferior to the wall length. In such configuration, the outer rib 68 extends only on a portion of the wall 65 of the bottom part 62. In this embodiment, the outer rib 68 does not reach the rim 78 of the bottom part 62 of the outer frame 60. In other embodiments, the outer rib 68 extends between the rim 78 and the bottom side 80.

The outer rib 68 of the wall 65 continues its course and extends in a straight line on the bottom side 80, forming a stripe 81. The bottom face 42 of the inner frame 20 comes into contact with the stripes 81 of the bottom side 80.

The bottom part 62 comprises a draining hole 63 configured to allow a fluid present in the bottom part 62 of the outer frame 60 to be evacuated from the bottom part 62.

The bottom part 62 further comprises a bottle receiving area 66 as described at FIG. 2. Each wall 65 of the outer frame 60 comprises at least one outer rib 68.

The bottle receiving area 66 has the shape of a cylinder, its wall 65 being circular and comprising an inner face 83, the bottle receiving area 66 additionally comprising a floor 85.

The bottle receiving area 66 comprises a plurality of bottle bars 82. The bottle bars 82 have a first portion 820 located on the inner face 83 of the bottle receiving area 66 and a second portion 822 of the bottle bars 82 located on the floor 85 of the bottle receiving area 66. Here, the bottle receiving area 66 comprises three bottle bars 82 evenly distributed around the inner face 83 and on the floor 85, two bottle bars 82 being separated by a 120° angle.

The first portions 820 of the bottle bars 82 located on the inner face 83 of the bottle receiving area 66 extend in a direction parallel to the A direction. These first portions 820 are configured to guide the receiver drier 4 inside of the bottle receiving area 66.

The second portions 822 of the bottle bars 82 located on the floor 85 of the bottle receiving area 66 extend in a direction perpendicular to the A direction. These second portions 822 are configured to hold the receiver drier 4.

Additionally, the floor 85 of the bottle receiving area 66 comprises an evacuation hole 87. The evacuation hole 87 is configured to allow a fluid present in the bottle receiving area 66 to be evacuated. This ensure that the bottle receiving area 66, and more generally the bottom part 62, is free of any liquid which could alter the function of the heat exchanging module 1 or damage it.

Together, the bottle bars 82 of the outer frame 60 and the bottle circling part 22 of the inner frame 20 hold the receiver drier 4 into place.

The bottle bars 82 holding the receiver drier 4 also have a vibration dampening role, to reduce the stress put on the receiver drier 4 by the vibration of the vehicle. Such vibration may, over a long time, deteriorate the receiver drier 4 or an element connecting the receiver drier 4 to the heat exchanger 2, causing a leak or a breakage.

The bottom side 80 and the bottle receiving area 66 are connected by a border 91, the border comprising three ridges 89, a ridge 89 being in continuity with a stripe 81 located on the bottom side 80.

Together with a top part 64, the bottom part 62 form the outer frame 60 of the housing 6. The top part 64 is shaped as a lid covering the open mouth of the bottom part 62. The top part 64 also comprises a bottle receiving part. The top part 64 may be exempt of outer ribs 68.

Figure 7:
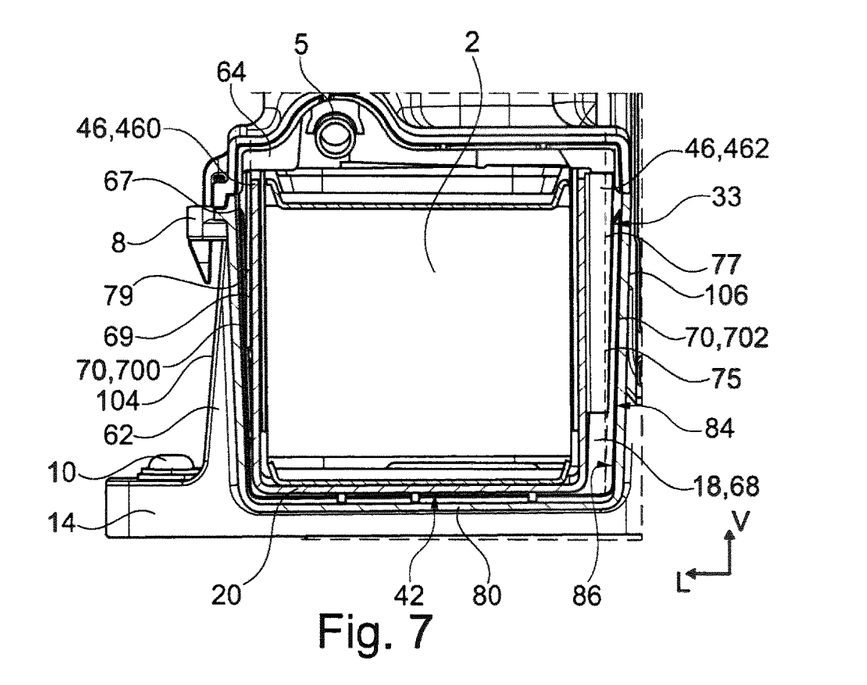
FIG. 7 is a sectional view of the heat exchanging module according to a cut plan I-I featured on FIG. 3.

The FIG. 7 represents a sectional view of the heat exchanging module 1 according to a cut plan I-I featured on FIG. 3.

FIG. 7 illustrates the heat exchanger 2 carried by the internal flange 28 of the inner frame 20, said inner frame 20 being carried by the outer frame 60.

The spacing means 17 further acts as a positioning means 84, to ease the positioning of the inner frame 20 inside the outer frame 60. Said spacing means 17 acting as the positioning means 84 is inclined relatively to a plane 75 of the outer surface 34 of the inner frame 20 or to a plane 69 perpendicular to the bottom side 80 of the bottom part 62 and parallel to the longitudinal direction L.

The spacing means 17 acting as positioning means 84 comprises an angled rib 46, which may be an inner rib 30 as explained in relation to the previous figures, the angled rib 46 being inclined relatively to the plane 75 of the outer surface 34 of the inner frame 20.

An angle 77 between the plane 75 and the angled rib 46 is strictly greater than 0° and inferior or equal to 2°. In this embodiment, the angle 77 is equal to 1°. The angle 77 is measured between the plane 75 and a plane in which a free edge 33 of the angled rib 46 extends. The free edge 33 of the angled rib is an edge of the angled rib 46 facing the inner face 70 of the bottom part 62 of the outer frame 60.

In this configuration, the angled rib 46 extends further outward the outer surface 34 of the inner frame 20 at the top edge 40 of the inner frame 20 than it does at a portion of the angled rib 46 closest to the bottom face 42.

The spacing means 17 acting as positioning means 84 may comprise at least one first angled rib 460, located at the first transversal side 104 of the housing 6, and at least one second angled rib 462, located at the second transversal side 106 of the housing 6.

The spacing means 17 acting as positioning means 84 may also further comprise an inner face 70 of the outer frame 60, said inner face 70 being inclined relatively to a plane 69 perpendicular to the bottom side 80 of the bottom part 62 and parallel to the longitudinal direction L.

An angle 79 between the plane 69 and a plane 67 in which the inner face 70 extends is strictly greater than 0° and inferior or equal to 5°. In this embodiment, the angle 79 is equal to 2°. The angle 79 is measured between the plane 67 in which the inner face 70 extends and the plane 69 perpendicular to the bottom side 80 of the bottom part 62 and parallel to the longitudinal direction L.

The spacing means 17 acting as positioning means 84 may comprise a first inner face 700, located at the first transversal side 104 of the housing 6, and a second inner face 702, located at the second transversal side 106 of the housing 6.

In this configuration, the first inner face 700 and the second inner face 702 are further apart of each other at the rim 78 of the bottom part 62 of the outer frame 60 than they are at the bottom side 80 of the bottom part 62.

The first angled rib 460 collaborates with the first inner face 700. The second angled rib 462 collaborates with the second inner face 702.

The first angled rib 460 and the first inner face 700 may be inclined in the same direction relatively to the plane 75 and the plane 69, respectively, the second angled rib 462 and the second inner face 702 being inclined in the same direction relatively to the plane 75 and the plane 69, respectively. The first angled rib 460 and the first inner face 700 are inclined in a sense opposed to the sense in which the second angled rib 462 and the second inner face 702 are inclined.

The spacing means 17 acting as positioning means 84 acts to offset a possible misalignment between the inner frame 20 and the outer frame 60, thus allowing a quicker, easier and more reliable insertion of the inner frame 20 inside the inner area 76 of the outer frame 60.

In another embodiment, the housing 6 comprises only one first angled rib 46 collaborating with a first inner face 700, the spacing means 17 acting as positioning means 84 being located on a first transversal side 104 or a second transversal side 106 of the housing 6. In yet another embodiment, the housing 6 may comprise a first angled rib 46 collaborating with a second inner face 702, each being located at a different transversal side of the housing 6.

Figure 8:
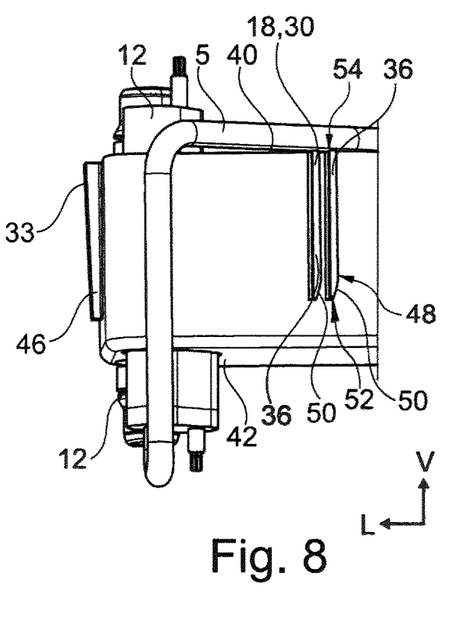
FIG. 8 is a side view of the inner frame comprising a heat exchanger, to better illustrate the configuration of the inner rib.
Figure 9:
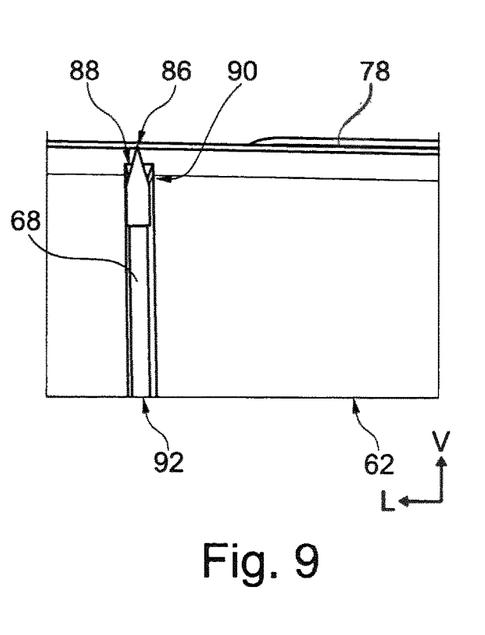
FIG. 9 is a side view of the outer frame comprising an outer rib, FIG. 10 features a retaining means located on the inner frame of the housing.

FIGS. 8 and 9 further illustrate the configuration of the inner rib 30 and the outer rib 68, respectively.

On FIG. 8, an inner rib 30 is represented. The inner rib 30 comprises a first indexing means 48 located at a vertical end of the inner rib 30. More specifically, the first indexing means 48 is located at a first vertical end 52 of the inner rib 30, the first vertical end 52 of the inner rib 30 being closer to the bottom face 42 of the inner frame 20. A second vertical end 54 of the inner rib 30 is in contact with the top edge 40 of the inner frame 20.

The first indexing means 48 of the inner rib 30 comprises a chamfer 50 of the side bars 36 constituting the inner rib 30. Each side bar 36 has a chamfer 50, the chamfer 50 of each side bar 36 facing the chamfer 50 of the other side bar 36.

Due to these chamfers 50, the bars of the inner rib 30 are further apart each other at the first vertical end 52 compared to the second vertical end 54.

The configuration of the first indexing means 48 of the inner rib 30 allows an easy insertion of the outer rib 68 inside the inner rib 30, by offsetting a possible misalignment between the inner rib 30 and the outer rib 68. With the first indexing means 48, the inner ribs 30 of the inner frame 20 need not be precisely aligned with the outer ribs 68 of the outer frame 60 for allowing the inner frame 20 to enter the inner area 76 of the outer frame 60. The first indexing means 48 also allows to neglect the manufacturing tolerance of the inner frame 20 and/or the outer frame 60.

The first indexing means 48 of the inner rib 30 is not limited to this embodiment, as long as the bars of the inner rib 30 are further apart each other at the first vertical end 52 compared to the second vertical end 54. Other embodiment of the first indexing means 48 of the inner rib 30 includes slanted side bars 36, the side bars 36 of the inner rib 30 being inclined in a different direction relatively to each other.

On FIG. 9, an outer rib 68 is represented. The outer rib 68 comprises a second indexing means 86 located at a vertical end of the outer rib 68. In the case of the outer rib 68, the second indexing means 86 is located at a second vertical end 90, which is the vertical end of the outer rib 68 closer to a rim 78 of the bottom part 62 of the outer frame 60, the first vertical end 92 being located at the bottom side 80 of the bottom part 62 of the outer frame 60.

The second indexing means 86 of the outer rib 68 comprises a chamfered portion 88 located at the second vertical end 90 of the single bar 74. The chamfered portion 88 gives the second vertical end 90 of the single bar 74 a "V" shape. This "V" shape forms a narrowed end of the outer rib 68.

The effect of the "V" shape of the second indexing means 86 of the outer rib 68 is the same as the effect of the first indexing means 48 of the inner rib 30. The second indexing means 86 of the outer rib 68 offset a possible misalignment between the inner rib 30 and the outer rib 68, to facilitate the mounting of the inner frame 20 inside the outer frame 60.

Together, the first indexing means 48 of the inner rib 30 and the second indexing means 86 of the outer rib 68 allow to offset an longitudinal misalignment between the inner frame 20 and the outer frame 60 which is superior to the misalignment offset by the presence of an indexing means 48, 86 on the inner rib 30 or the outer rib 68. The first and second indexing means 48, 86 therefore make the mounting of the housing 6 easier and less prone to mishaps.

Figure 10:
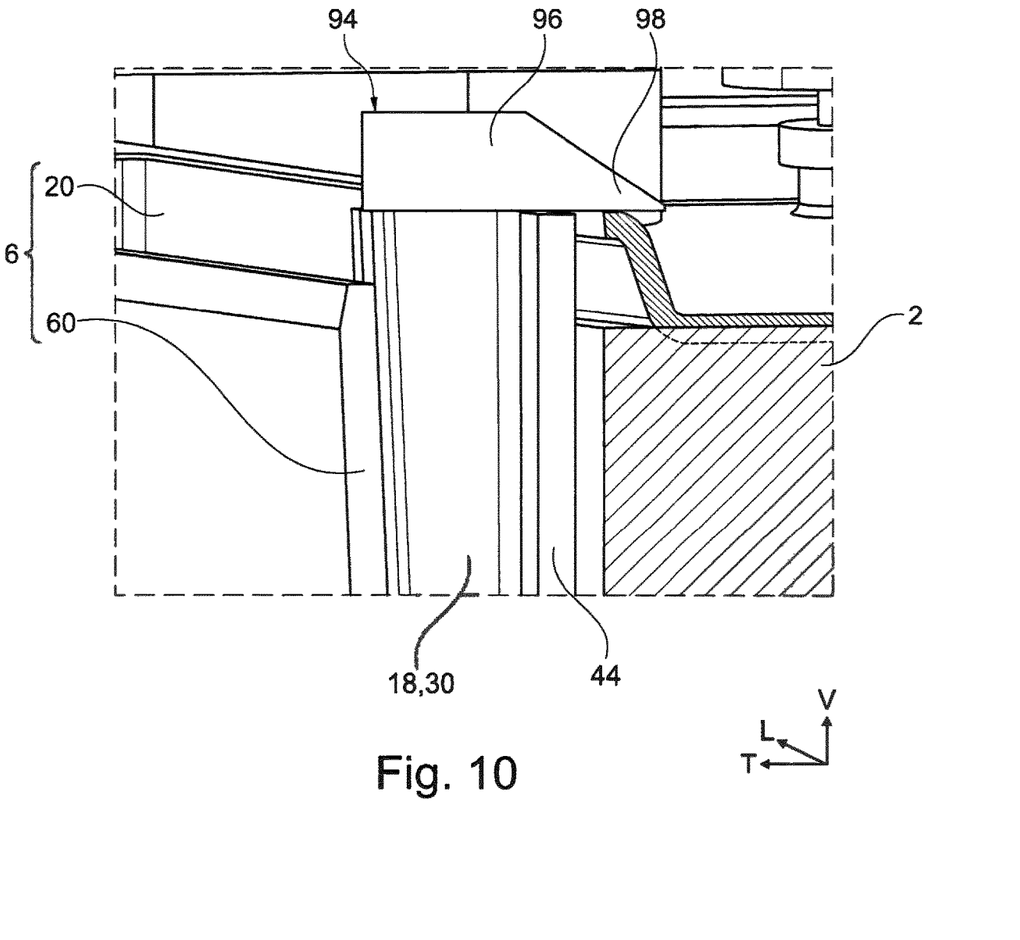

FIG. 10 features a retaining means 94 configured to limit the movement of the heat exchanger 2 out of the inner frame 20.

A retaining means 94 according to the embodiment here described comprises at least a base 96 and a tooth 98. The base 96 is connected to the top edge 40 of inner frame 20, for example prolonging an inner rib 30 as described above.

The tooth 98 of the retaining means 94 extends toward the inner space 38 of the inner frame 20.

The tooth 98 of the retaining means 94 has deformation properties. Such deformation properties allow the deformation of the tooth 98 during the insertion of the heat exchanger 2 in the inner space 38 of the inner frame 20. The tooth 98 is deformed during the insertion of the heat exchanger 2 before springing back into its original shape. In its original shape, the tooth 98 limits the movement of the heat exchanger 2 out of the inner space 38. The handling of the inner frame 20 comprising the heat exchanger 2 is then reliable, the retaining means 94 limiting the movement of the heat exchanger 2 out of the inner frame 20 and in consequence the risk of the heat exchanger 2 getting out of the inner space 38, for example while the inner frame 20 with its heat exchanger 2 is manipulated by a production robot.

The tooth 98 may also be deformed by an operator to allow the extraction of the heat exchanger 2, for example for maintenance or replacement. This operation is done without damaging or destroying a part of the heat exchanging module 1.

In another embodiment of the invention, the retaining means 94 is positioned onto the inner frame 20 after the insertion of the heat exchanger 2 inside the inner frame 20. In this embodiment, the retaining means 94 features a securing means configured to allow the fixation of the retaining means 94 on the inner frame 20. Such a securing means also allows the removal of the retaining means 94 without damaging the retaining means 94 or the inner frame 20.

An example of assembling of the heat exchanging module 1 will now be described. The process here described is an example of assembly, and should not limit the scope of the invention. Steps can be performed in different order or simultaneously.

Each piece is separately manufactured. For example, the heat exchanger 2 is formed by a superposition of plates brazed together, with the addition of elements such as the fluid ports 12, and the inner frame 20 and the outer frame 60 are each obtained through a plastic injection process.

The heat exchanger 2 is inserted into the inner space 38 of the inner frame 20. The receiver drier 4 is then inserted inside the circle part 24 of the inner frame 20, the two bands 27 allowing to easily slide the receiver drier 4 inside the bottle circling part 22. The receiver drier 4 is then secured between the two bands 27 by the tightening means 25. The receiver drier 4 is then connected to the heat exchanger 2 by the pipe 5.

The inner frame 20, comprising the heat exchanger 2 and the receiver drier 4, is then inserted inside the inner area 76 of the outer frame 60. The receiver drier 4 slides into the bottle receiving area 66 of the bottom part 62 of the outer frame 60. The top part 64 of the outer frame 60 is then arranged over the bottom part 62, the attachment means 8 of the outer frame 60 locking together the two parts of the outer frame 60.

The heat exchanging module 1 may now be placed inside the vehicle, and connected to the air conditioning system.

The heat exchanging module 1 according to the invention may have additional features, such as the retaining means 94, the first indexing means 48 or the second indexing means 86, the assembling process then comprising additional steps, such as those described below.

During the insertion of the heat exchanger 2 inside the inner frame 20 having a retaining means 94, the heat exchanger 2 may deform the tooth 98 of the retaining means 94. Once fully inserted into the inner space 38, the tooth 98 returns to its original shape and locks the heat exchanger 2 inside the inner frame 20. The inner frame 20 may then be inserted inside the bottom part 62.

In the case of an inner frame 20 having a first indexing means 48 and the outer frame having a second indexing means 86, the first indexing means 48 of the inner rib 30 and the second indexing means 86 of the outer rib 68 collaborates to facilitate this insertion. The insertion is further facilitated by the spacing means 17 acting as positioning means 84 located on the inner frame 20 and on the outer frame 60.

A heat exchanging module 1 according to the invention and assembled along the description made hereabove may now perform its function of heat exchanging.

Preceding description clearly illustrates how the invention fulfills its objectives, as laid out in the preamble, and offers a heat exchanging module 1 having a housing 6 featuring thermal isolation properties.

Several modifications and improvement might be applied by the person skilled in the art to the heat exchanging module 1 as defined above, as long as it comprises a housing 6 having an inner frame 20 arranged for holding the heat exchanger 2 and an outer frame 60 being arranged for holding the inner frame 20, the inner frame 20 and the outer being separated by a non-null distance 100 configured to form a thermal isolation between the heat exchanger 2 and a surrounding environment of the housing 6.

In any case, the invention cannot and should not be limited to the embodiments specifically described in this document, as other embodiments might exist. The invention shall spread to any equivalent means and any technically operating combination of means.

The invention claimed is:

1. A heat exchanging module comprising:
   at least a heat exchanger configured to exchange heat between two fluids flowing internally within the heat exchanger; and
   a housing,
   said housing having at least an inner frame and an outer frame, the inner frame being arranged for holding the heat exchanger, the outer frame being arranged for holding the inner frame,
   the inner frame comprising:
   a first vertical side and a second vertical side, and
   a plurality of walls extending between a bottom face at the second vertical side and a top edge at the first vertical side,
   wherein the plurality of walls define an inner space, and the heat exchanger is fully inserted into the inner space,
   wherein the inner frame is open at the first vertical side and closed at the second vertical side,
   wherein the inner frame and the outer frame are separated by a non-null distance configured to form a thermal isolation between the heat exchanger and a surrounding environment of the housing.

2. The heat exchanging module according to claim 1, wherein the inner frame and/or the outer frame comprises at least one spacer on at least one side.

3. The heat exchanging module according to claim 2, wherein the non-null distance is generated by the at least one spacer.

4. The heat exchanging module according to claim 2, wherein the at least one spacer comprises at least a rib formed on at least the inner frame or the outer frame.

5. The heat exchanging module according to claim 4, wherein the rib extends between the inner frame and the outer frame.

6. The heat exchanging module according to claim 4, wherein the outer frame comprises an outer rib, said outer rib extending on the inside of the outer frame, the inner frame having an inner rib extending on the outside of the inner frame, wherein the outer rib and the inner rib collaborates to limit a movement between the outer frame and the inner frame.

7. The heat exchanging module according to claim 6, wherein the inner rib and the outer rib have complementary shapes.

8. The heat exchanging module according to claim 6, wherein the outer rib enters in the inner rib.

9. The heat exchanging module according to claim 3, wherein at least one internal flange extends in an inner space delimited by the inner frame.

10. The heat exchanging module according to claim 9, wherein the internal flange of the inner frame is arranged for mechanically holding the heat exchanger.

11. The heat exchanging module according to claim 1, wherein the housing is arranged for receiving a receiver drier of the heat exchanging module.

12. The heat exchanging module according to claim 11, wherein the inner frame is configured to carry the receiver drier.

13. The heat exchanging module according to claim 11, wherein the housing comprises at least a bottle bar inside an area arranged for holding the receiver drier, said bottle bar making contact with said receiver drier.

14. The heat exchanging module according to claim 13, wherein the bottle bar extends from the outer frame.

15. The heat exchanging module according to claim 1, comprising a receiver drier.

16. The heat exchanging module according to claim 1, wherein the outer frame comprises at least two parts, a bottom part and a top part that define an inner area of the outer frame.

17. The heat exchanging module according to claim 1, wherein the housing is made of an insulating material.

18. The heat exchanging module according to claim 2, wherein the at least one spacer is inclined relatively to a plane of an outer surface of the inner frame or to a plane perpendicular to a bottom side of the outer frame and parallel to a longitudinal direction L.

19. The heat exchanging module according to claim 2, wherein the at least one spacer comprises an indexing means facilitating the insertion of the inner frame inside of the outer frame.

20. The heat exchanging module according to claim 19, wherein the indexing means is located at an end of the rib.

21. The heat exchanging module according to claim 1, wherein the housing comprises at least one retainer configured to hold the heat exchanger inside the inner frame.

22. A process of assembly of a heat exchanging module according to claim 1, comprising:
   mounting of the heat exchanger inside the inner frame;
   mounting of the inner frame inside the outer frame.

23. The process of assembly according to claim 22, wherein mounting of the inner frame further comprises an intermediate step of mounting the inner frame inside of a bottom part of the outer frame, the process further comprising: a third step of mounting of a top part of the outer frame on the bottom part of the outer frame.

* * * * *